US007312749B2

(12) United States Patent
Yeh (10) Patent No.: US 7,312,749 B2
(45) Date of Patent: Dec. 25, 2007

(54) MULTI-FUNCTION APPARATUS AND RELATED METHOD INTEGRATED WITH POSITIONING/ORIENTATION MECHANISM (75) Inventor: Iang-Chi Yeh, Taipei Hsien (TW)

(73) Assignee: VIA Technologies Inc., Hsin-Tien, Taipei Hsien (TW)

(*) Notice: Subject to any disclaimer, the term of this patent is extended or adjusted under 35 U.S.C. 154(b) by 0 days.

(21) Appl. No.: 11/420,808

(22) Filed: May 30, 2006

(65) Prior Publication Data
US 2007/0024501 A1 Feb. 1, 2007

(30) Foreign Application Priority Data
Jul. 28, 2005 (TW) .............. 94125570 A (51) Int. Cl.
G01S 5/14 (2006.01)
(52) U.S. Cl. .............. 342/357.13; 342/357.07; 701/206; 701/210
(58) Field of Classification Search ........ 342/357.06, 342/357.07, 357.13; 340/992.19; 701/206, 701/210, 213
See application file for complete search history.

(56) References Cited
U.S. PATENT DOCUMENTS
5,543,802 A * 8/1996 Villevieille et al. ........ 701/206

5,802,492 A * 9/1998 DeLorme et al. ........... 701/213
6,278,938 B1 * 8/2001 Alumbaugh ................ 701/213
2005/0253753 A1 * 11/2005 Lalik et al. ............ 342/357.13

FOREIGN PATENT DOCUMENTS
CN 1312193 A * 9/2001

OTHER PUBLICATIONS
About.com, GPS unit which doubles as MP3 player announced from Lowrance, Nov. 4, 2004.*

* cited by examiner

Primary Examiner—Thomas H. Tarcza
Assistant Examiner—Fred H. Mull
(74) Attorney, Agent, or Firm—Winston Hsu (57) ABSTRACT Multi-function apparatus and related method integrated with positioning/orientation mechanism. The apparatus of the invention works under a forward mode for recording reference coordinates/altitudes of a departure point and passing points along a track which a user moves. When the user wants to trace back, the apparatus works under a backward mode for comparing each of the recorded reference coordinates/altitudes with a current coordinate/altitude of the user, and providing direction/altitude orientation for the user so that the user can trace back to the original departure and/or passing points.

16 Claims, 6 Drawing Sheets

MULTI-FUNCTION APPARATUS AND RELATED METHOD INTEGRATED WITH POSITIONING/ORIENTATION MECHANISM

BACKGROUND OF THE INVENTION

1. Field of the Invention

The present invention relates to a multi-function electronic apparatus and related method integrated with a positioning/orientation mechanism, and more particularly, to a multi-function electronic apparatus and related method capable of guiding a user along a track (e.g., path) leading back to an originating location without having to download an electronic map.

2. Description of the Prior Art

The continued development of semiconductors has offered smaller and lighter weight components. Specifically, these development advances have resulted in the volume and weight of electronic devices decreasing tremendously to allow better portability for consumers. For example, a portable electronic device, such as a music player, is commonly used and widely accepted by consumers in the modern information society as a daily convenience.

The portable music/video player allows the user to enjoy audio and visual entertainment. Additionally, the functions supported by the portable music/video player are increasing gradually. Especially, a person nowadays places greater emphasis on leisure time activities. For example, a person will enjoy exploring new hobbies during his or her free leisure time such as re-discovering nature. When the user carries the portable music/video player, an important issue, which most manufacturers are concerned with, is how to better provide a portable apparatus that is capable of assisting the user in enjoying their leisure activities safely and conveniently.

SUMMARY OF THE INVENTION

Therefore the main objective of the claimed invention is to provide a multi-function electronic apparatus integrated with a positioning/orientation mechanism, for example a portable music/video player integrated with a positioning/orientation mechanism to assist a user in enjoying their leisure activities safely and conveniently.

Geographical positioning systems such as the global positioning system (GPS) are well established and have been increasingly utilized by consumer electronic devices in recent years. On the Earth's surface, when a positioning signal of a predetermined satellite is received and analyzed, a positioning coordinate and altitude of the receiving point can be calculated and detected, such as longitude, latitude, and vertical altitude from the ground's surface. The claimed invention integrates a positioning mechanism into a multi-function electronic apparatus and utilizes the positioning mechanism to realize various orientation mechanisms to provide more convenience for the user of the music/video player device when the user is participating in outdoor activities.

The positioning/orientation mechanism of the claimed invention has various modes and functions. Firstly, the claimed invention has a return orientation function that provides a return route; when the user is lost in the outdoors, the multi-function electronic apparatus of the claimed invention provides information indicators such as direction of the return route as well as altitude to guide the user along a track leading back to an originating location (i.e., a departure point or the previous passing points along the track taken from the departure point to the user's current location). When the user begins to move (i.e., when the outdoor activity begins), the electronic apparatus is capable of operating in a forward mode to record a coordinate/altitude of the departure point into a reference/altitude; during the period of moving, when the user passes through an intersection or a particular spot along the track, the user can utilize the electronic apparatus to record these coordinates/altitudes as references. When the user decides to return to the departure point, or when the user discovers that he or she is lost and wants to return to the departure point, the electronic apparatus of the claimed invention is then capable of operating in a backward mode to detect a current coordinate/altitude that allows a comparison between the current coordinate/altitude and a previous reference coordinate/altitude. The electronic apparatus prompts the user at each reference coordinate relative to the direction/altitude of the user according to the comparison result (e.g., a visual interface can be utilized to prompt the user). Hence, the user can follow the direction/altitude as guided by the electronic apparatus of the claimed invention to return to the previous spot/intersection or to the originating departure point.

In the above-mentioned, the claimed invention utilizes the previous departure and passing points as reference coordinates for the return route therefore the claimed invention is not required to download an electronic map to guide the user while assisting the user in returning to their departure point. The commonly utilized electronic map refers to coordinates recorded in the map that are already known, such as coordinates of buildings and coordinates of a street such as the street's beginning, ending, and intersections. However, the electronic map is mostly utilized in a metropolitan setting and the associated electronic map requires a great amount of memory resources. When the user is participating in outdoor activities, there may likely not be any suitable electronic maps available. Thus, the claimed invention is capable of indicating the return route for the user without utilizing the electronic map. In addition, the claimed invention can be widely considered for other uses and in other settings. Finally, the claimed invention does not require that an electronic map with a large amount of memory capacity be pre-download.

Furthermore, the multi-function electronic apparatus of the claimed invention is further utilized for recording changes in the terrain along the track traveled by the user according to a terrain data. For example, in the forward mode (which is also the same mode as when the user begins to move), when the user passes a protruding land feature (protruding land features include geographic elements such as hills), the electronic apparatus is triggered to update the terrain data; and when the user triggers the data, the electronic apparatus increases the terrain data by 1. In the backward mode, the electronic apparatus of the claimed invention decreases the terrain data for the user by 1. When the terrain data decreases to zero, it represents the case where the user is able to return to his or her departure point without passing through (i.e., over or around) any additional protruding land features. For example, after the user leaves the departure point and then proceeds to pass over three hills. At that time, the terrain data value is accumulated to three. In other words, in this given example, for the user to travel a track from the departure point to arrive at a given particular point which are formed by the terrain data accumulated to three because the user passes over three hills. Later, the user returns back to the departure point by traveling on the return route when a hill is passed. The terrain data is decreased by one until the terrain data becomes zero. When the terrain data is equal to zero, the user passed three hills on the return route, and there is no further hill to be passed on the return route. In another words, when the terrain data decreases to zero, the user can move to a higher location or a lower location according to the current altitude of the user and the altitude of the departure point.

The electronic apparatus of the claimed invention further comprises an arrival notice/warning function. The user can input a coordinate/altitude data of a destination into the electronic apparatus. When the user moves towards the destination, the present invention continues checking whether the current coordinate/altitude of the user is close to the coordinate/altitude of the destination. If so, the electronic apparatus will produce (i.e., emit or send out) a warning prompt to remind the user that the destination is close by or that the user has arrived at the destination. The notice/warning function can be integrated with the music/video functionality of the electronic apparatus. For example, the user can preset a music/video warning, and the user can utilize the electronic apparatus to play music/video while moving. When the user arrives at the destination, the electronic apparatus of the claimed invention can further prompt the user by inserting a warning video/sound simultaneously while the music/video continues to play.

In conclusion, the claimed invention is capable of integrating the positioning/orientation function into the portable audio/video apparatus. The apparatus not only provides audio and visual entertainment to the user but also assists the user by providing a more convenient means for safely participating in many outdoor activities.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
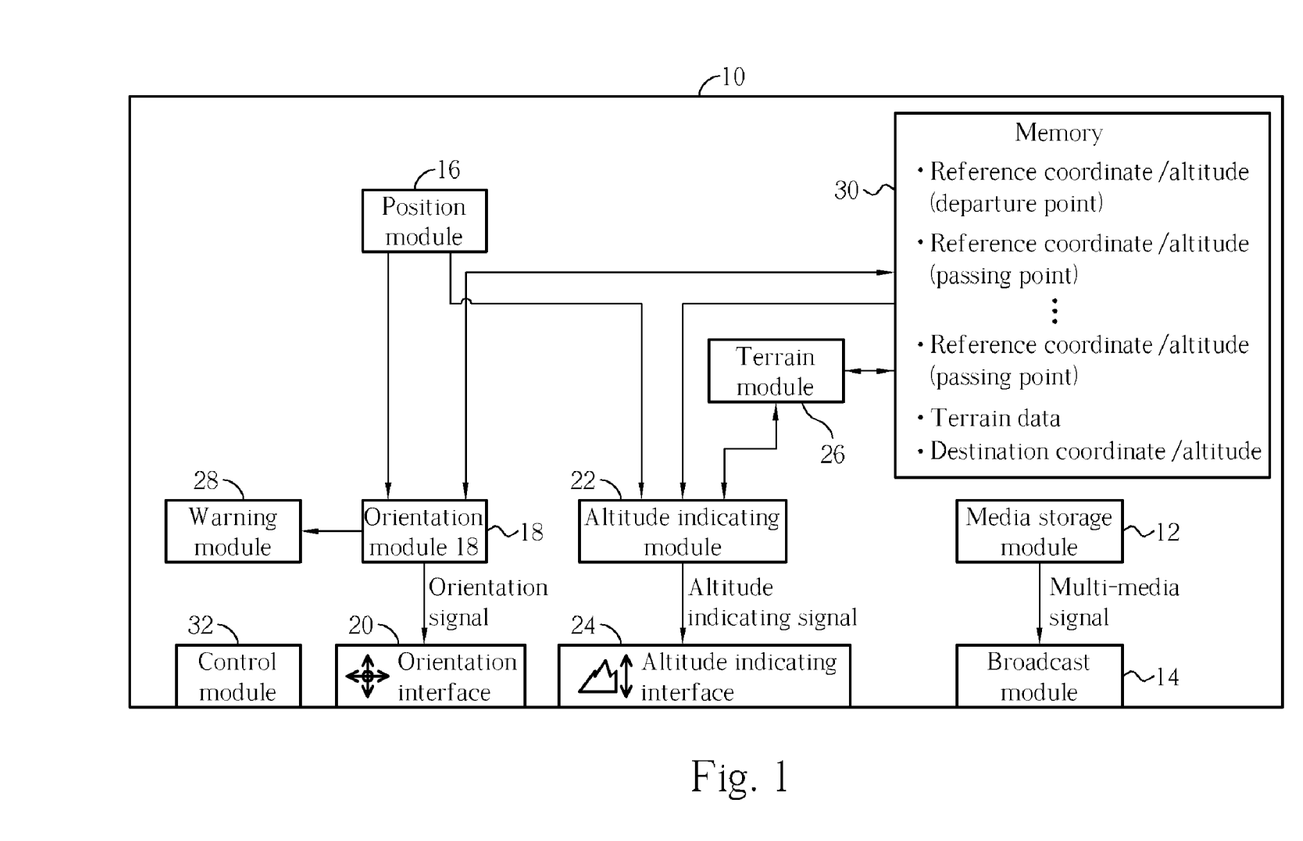
FIG. 1 illustrates a functional block diagram of an electronic apparatus according to the present invention.

Please refer to FIG. 1. FIG. 1 illustrates a functional block diagram of a multi-function electronic apparatus 10 integrated with a positioning/orientation mechanism according to an embodiment of the present invention. A portable audio/video apparatus integrated with a positioning/orientation function is an embodiment of the present invention. In order to realize the positioning/orientation function in the electronic apparatus 10 of the present invention, the electronic apparatus 10 further includes a position module 16, an orientation module 18, an orientation interface 20, an altitude indicating module 22, an altitude indicating interface 24, a terrain module 26, a warning module 28, a memory 30, and a control module 32. In order to play music/video, a media storage module 12 and a broadcast module 14 may be installed in the electronic apparatus 10. The media storage module 12 is capable of storing multi-media files and providing a corresponding multi-media signal. The broadcast module 14 is capable of broadcasting the multi-media signal. For example, if the electronic apparatus 10 is a portable music player (such as a MP3 player where MP3 is a compressed music file format), the media storage module 12 can decompress/decode the music file and provide a multi-media signal, and the broadcast module 14 can include a loudspeaker (or an earphone) to broadcast the multi-media file provided as sound waves. If the electronic apparatus 10 is a portable DVD player, the media storage module 12 can include a mechanism such as a CD server/register to read and decode video files on the disc to become multi-media signal, and the broadcast module 14 has a display and a loudspeaker (or an earphone) installed to present the multi-media signal into images and sound waves.

In the embodiment of the present invention, the GPS is utilized for positioning as the position module 16 includes a corresponding antenna, a related signal processing circuit and a decoder for receiving wireless signals transmitted from each satellite to be processed and thus detecting a current position of the electronic apparatus 10 such as longitude/latitude of the coordinate and vertical altitude from the ground surface. In this way, when the user carries the electronic apparatus 10, the position module 16 can detect each coordinate/altitude along a track or path that the user has traveled.

According to the coordinate/altitude provided by the position module 16, the warning module 28 is capable of realizing an arrival notice/warning function, and the orientation module 18 and the altitude indicating module 22 can be utilized to realize an orientation/altitude function. The memory 30 is utilized for recording (i.e., storing) related information required for generating prompts regarding: warnings, positioning, orientation, and altitude. The terrain module 26 is capable of managing a terrain data that records a number of undulant terrain counts along the track that the user traveled. In the embodiment of the present invention, the orientation interface 20 and the altitude indicating interface 24 are graphic display interfaces for prompting the user in utilizing graphic frames. The control module 32 is capable of receiving commands from the user for controlling operations of the other modules such as the orientation module 18, the altitude indicating module 22, the media storage module 12, the broadcast module 14, the warning module 28 and the terrain module 26.

The integrated positioning/orientation mechanism of the present invention is capable of providing multi-functions/modes by utilizing the orientation module 18, the altitude indicating module 22 and the warning module 28. First in the arrival notice/warning function, when the user is moving towards a destination, the user can activate the warning module 28 via the control module 32 and also input coordinate/altitude of the destination into the electronic apparatus 10 to be stored into the memory. During the movement period, the warning module 28 controls the orientation module 18 to continuously compare the current coordinate of the user to the destination coordinate to determine if the user is approaching the destination. If the orientation module 18 and the altitude indicating module 22 discovered that the current coordinate/altitude of the user is close to the coordinate/altitude of the destination (i.e., the difference of the two coordinates/altitudes is less than a predetermined value), then the warning module 28 prompts and notifies the user that the user has approached the destination.

In one embodiment of the present invention, the warning module 28 can utilize the function of the broadcast module 14 to prompt the user. For example, the warning module 28 can mix a preset prompt/warning of a video signal into the multi-media signal so that the broadcast module 14 can broadcast the two signals together; hence when the user enjoys listening or watching the multi-media signals, the user can also hear and see the arrival notice/warning prompt. Otherwise, the warning module 28 can also temporarily stop the broadcast module 14 in broadcasting multi-media signals, and broadcast the preset video/audio to prompt the user that the user has approached the destination. When the broadcast module 14 is utilized to broadcast the multi-media signals, the warning module 28 can also activate the broadcast module 14 automatically to broadcast the arrival notice/warning prompt when prompting the user. Furthermore, the present invention can also combine the functions of the media storage module 12 and select the arrival notice/warning prompt. When the warning module 28 is going to prompt the user, the media storage media 12 can be changed to access the multi-media visual/audio files preset by the user. For example, the electronic apparatus can be a portable music player capable of playing ten different types of music (such as ten songs), and the user can select a section of the music as the arrival notice prompt. When the warning module 28 is going to prompt the user, the media storage module 12 jumps to and broadcast the section of the music as the arrival notice prompt. Furthermore, the warning module 28 also includes a visual interface (such as a warning light) or other interfaces (such as a vibration indicator) for prompting the user that they are approaching the destination. The electronic apparatus 10 may be a portable audio/video apparatus or a portable communication apparatus such as a portable music player, a mobile phone, or a portable DVD player.

Figure 2:
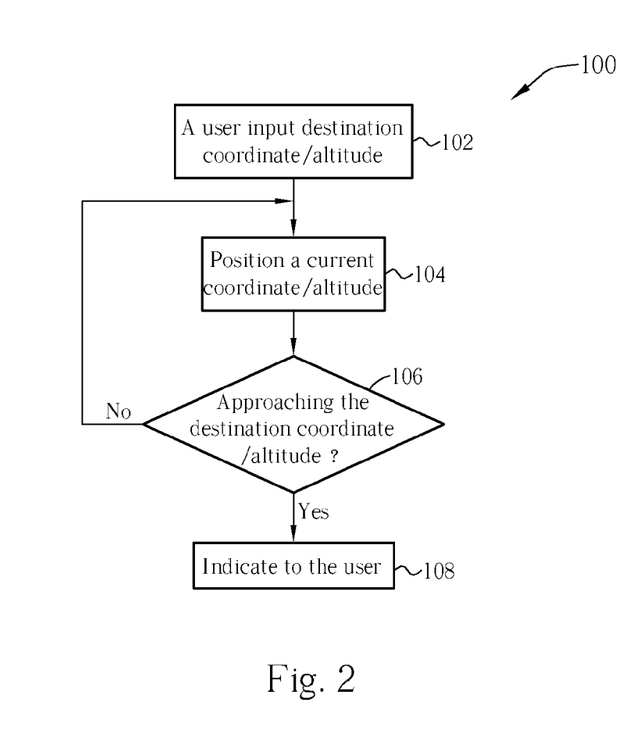
FIG. 2 illustrates a flow of the electronic apparatus of FIG. 1 realizing an arrival notice/warning process.

Please refer to FIG. 2 and FIG. 1 at the same time. FIG. 2 illustrates a flow 100 of the electronic apparatus 10 of FIG. 1 realizing an arrival notice/warning process according to the present invention. The flow 100 of FIG. 2 includes the following steps:

Step 102: A user, before heading towards a destination, activates an arrival notice/warning function via the control module 32 (FIG. 1) and inputs the coordinate/altitude of the destination;

Step 104: The user carries the electronic apparatus 10 and moves towards the destination; during the movement period, the position module 16 continues to detect a current coordinate/altitude of the user (also of the electronic apparatus 10 because it is being carried by the user);

Step 106: Under the management of a warning module 28, the orientation module 18 and the altitude indicating module 22 can continuously compare if the current coordinate/altitude is approaching the coordinate/altitude of the destination. According to the comparison result, the warning module 28 is capable of determining whether the user has approached the destination which means whether difference of the current coordinate/altitude and the coordinate/altitude of the destination is less than a predetermined value. If so, proceed to step 108; if not, proceed back to step 104 and continue to check whether the current coordinate/altitude is approaching the coordinate/altitude of the destination;

Step 108: Send out an arrival notice/warning prompt to notify the user that the destination is nearby or that the user has already arrived at the destination.

In realizing the flow 100, the present invention can at the same time determine whether the user has arrived at the destination by utilizing coordinates and altitudes, and determine whether the user has arrived at the destination according to either the coordinates or the altitudes. For example, in step 102, the user can input the altitude of the destination, and steps 104 and 106 can compare whether the current altitude of the user is approaching the altitude of the destination. If so, the prompt is sent out in step 108. For example, as the user is rock climbing, when the user has reached a higher altitude, the user may be required to take some special precaution such as keeping themselves warm or avoiding high altitude disease. In this embodiment, the user can utilize the function of the above-mentioned to determine if a current altitude is close to a preset target altitude. Furthermore, the user can also pre-record a plurality of preset target altitudes in the memory 30, therefore when the user starts climbing; the user can choose a destination. For example, the user can set coordinates/altitudes of the user's home and office as each target coordinate/altitude in the memory 30. When the user is heading towards the office from home, the user can select the office as a destination, and the electronic apparatus 10 will prompt the user before approaching the office. Relatively, when the user is heading back home from the office, the user then sets home as a destination and the electronic apparatus 10 will prompt the user before approaching home.

In conclusion, the arrival notice/warning function of the present invention can prompt the user when the user is approaching the destination, the arrival notice/warning function can prevent the user from mistakenly passing through the destination without realizing they are doing so. For example, when the user is traveling on a public transport, the user may attend to other activities such as reading or listening to music, and the user can easily miss their destination. A preset arrival time may be set to prompt the user; however, the preset time may be inaccurate in prompting the user before approaching the destination. The present invention can prompt the user accurately when approaching (i.e., arriving) the destination without causing the user to pass through or past the destination.

Other than the arrival notice/warning function, the present invention also provides a return orientation function for a return route or track. Please refer to FIG. 1. The electronic apparatus 10 of FIG. 1 is capable of operating in a forward mode and a backward mode. When the user begins to move (such as rock climbing or hiking), the electronic apparatus 10 is set to operate in the forward mode via the control module 32. In this mode, the position module 16 is capable of detecting coordinate/altitude of a departure point; during the movement period, the position module 16 can detect each coordinate/altitude along the track, and the memory 30 records one of the coordinates/altitudes as a reference coordinate/altitude. For example, during departure, the user can record the coordinate/altitude of the departure point as a reference coordinate/altitude via the control module 32. During the movement period, when the user sees a noticeable passing point (such as an intersection or a turn on a road), the user can trigger the control module 32 and record the coordinate/altitude of the passing point as a corresponding reference coordinate/altitude.

When the user wants to return (such as when the user is lost and wants to return to the departure point), the user can set the electronic apparatus 10 to operate in the backward mode via the control module 32. In this mode, the orientation module 18 compares the current coordinate of the user and a reference coordinate of the memory 30 and generates a corresponding directional signal according to a difference between the two coordinates. At the same time, the altitude indicating module 22 also compares the current coordinate of the user and the reference coordinate of the memory 30 and generates a corresponding altitude indicating signal according to the difference between the current coordinate and reference coordinate. The orientation interface 20 then indicates the directional signal to the user so that the user knows the reference coordinate relative to the user's direction (such as north, south, east and west). The altitude indicating interface 24 also indicates the altitude indicating signal to the user so that the user knows the altitude of the reference coordinate relative to the altitude of the user. For example, the orientation module 18 compares the current coordinate and the reference coordinate. If the longitude of the current coordinate is greater than the longitude of the reference coordinate, the reference coordinate is positioned to the west of the user (if the longitude of the current coordinate is smaller than the longitude of the reference coordinate, the reference coordinate is positioned to the east of the user). If the latitude of the current coordinate is greater than the latitude of the reference coordinate, the reference coordinate is positioned to the south of the user (if the latitude of the current coordinate is smaller than the latitude of the reference coordinate, the reference coordinate is positioned to the north of the user). The orientation module 18 can reflect on the reference coordinate relative to the position of the user (north, south, east, west) in the directional signal. The orientation interface 20 can display the relative direction to the user and indicate the direction towards the position of the reference coordinate. Similarly, the altitude indicating module 22 compares the altitude of the current coordinate and the altitude of the reference coordinate. If the reference coordinate is greater than the altitude of the current coordinate, the altitude indicating module 22 controls the altitude indicating interface 24 to prompt the user to move upwards (such as to move to a higher ground).

According to the prompt of the orientation interface 20 and the altitude indicating interface 24, the user can move towards the reference coordinate, and returning to the reference coordinate. In more details, in the backward mode, the orientation module 18/altitude indicating module 22 of the present invention can further operate in a sub-directional mode and a sub-tracking mode. In the sub-directional mode, the orientation module 18/altitude indicating module 22 can directly utilize the reference coordinate of the departure point for comparison to prompt the user to return to the departure point directly. In the sub-tracking mode, the orientation module 18/altitude indicating module 22 can utilized the reference coordinates along the track traveled as standards for comparison to prompt the user to move along the track traveled and eventually return to the departure point.

Figure 3:
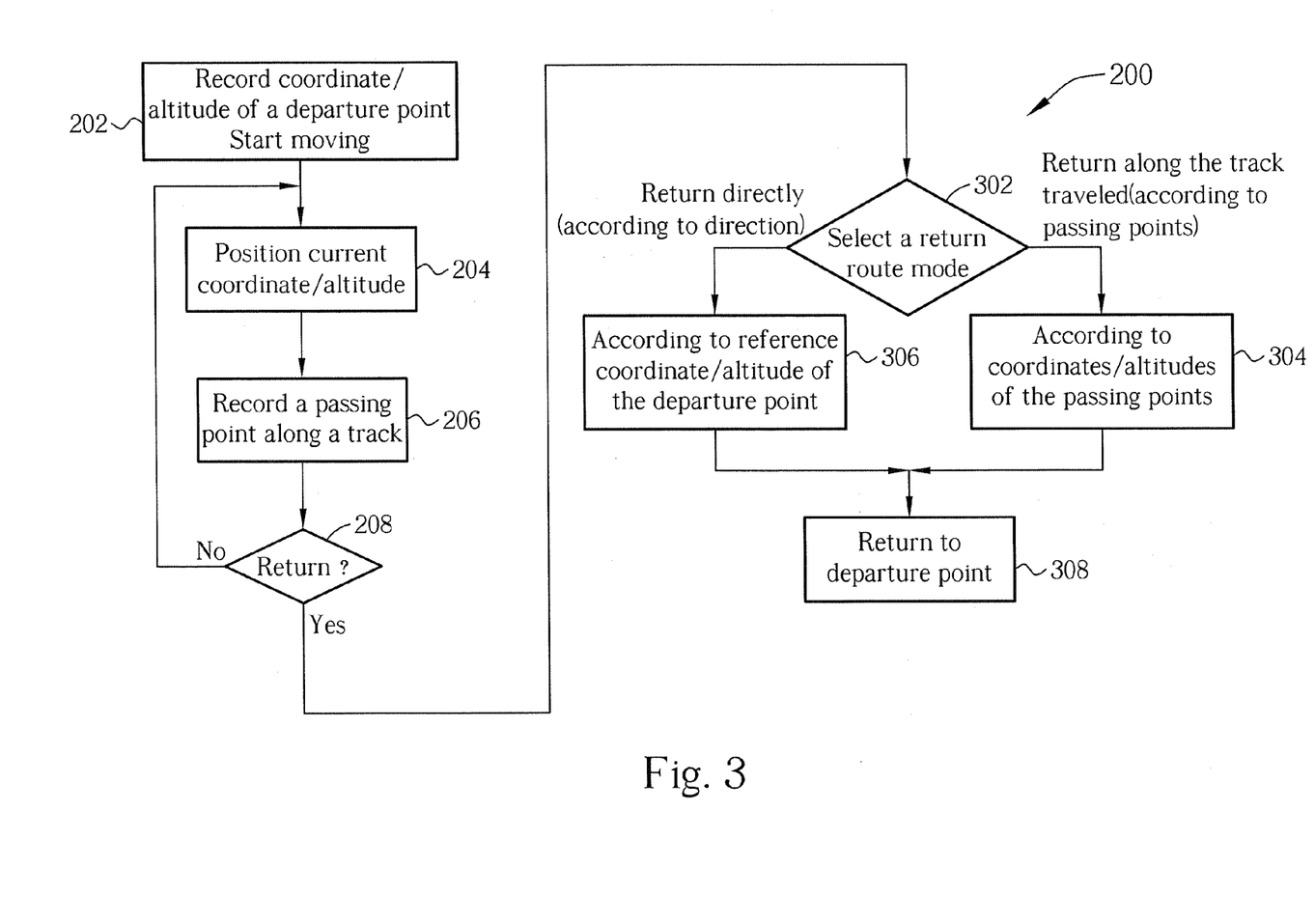
FIG. 3 illustrates a flow of the electronic apparatus of FIG. 1 realizing a return/orientation process.

Please refer to FIG. 3 and at the same time to FIG. 1. FIG. 3 illustrates a flow 200 of the electronic apparatus 10 of FIG. 1 providing process of a return route function. The flow 200 includes the following steps:

Step 202: a user carries the electronic apparatus 10 and begins a journey. At a departure point, the user triggers the electronic apparatus 10 so that the electronic apparatus 10 operates in a forward mode by the control module 32 and the memory 30 records the coordinate/altitude of the departure point as a reference coordinate/altitude;

Step 204: during the movement period, a position module 16 continues to detect the current coordinate/altitude of the user;

Step 206: when the user passes through a passing point (such as an intersection or a turn on a road), the user records the coordinate/altitude of the passing point as a reference coordinate/altitude via control of the control module 32;

Step 208: the user decides to end their journey and return. If the user decides to return, the user triggers the electronic apparatus 10 via the control module 32 to operate in a backward mode. If not, the flow 200 continues to repeat steps 202, 206, and 208;

Step 302: when the user heads back, the user selects a return route mode via the control module 32. If the user wants to return to the departure point directly, the user selects a sub-directional mode, proceed to step 306. If the user wants to return to the departure point via the passing points along the track traveled, the user selects a sub-tracking mode, proceed to step 304;

Step 304: in the sub-tracking mode, the orientation module 18/altitude indicating module 22 guides the user to move towards a reference coordinate according to a most recent reference coordinate/altitude recorded in a memory. When the user approaches (arrives) at a reference coordinate, the orientation module 18/altitude indicating module 22 sets a second most recent reference coordinate to prompt the user to move towards the direction of a reference coordinate. Hence, the user can move along the previous passing points;

Step 306: in the sub-directional mode, the orientation module 18/altitude indicating module 22 directly set the departure point for comparison to prompt the user to move towards the departure point (passing through the passing points);

Step 308: under the operation of the orientation module 18/altitude indicating module 22, the user can return to the departure point by following to the prompt of the orientation interface 20/altitude indicating interface 24.

In other words, in the flow 200, step 202 through step 208 can be viewed as a forward sequence and step 302 through step 308 can be viewed as the corresponding return sequence. The electronic apparatus 10 of the present invention is utilized to realize the flow 200 such that the user gets assistance in returning to the departure point when the user is lost. From FIG. 3 and its related explanation, each reference coordinate along a track traveled by the user is recorded in the memory 30 on the return route, the electronic apparatus 10 does not require an electronic map to provide preset coordinate of each known point, whereas the electronic apparatus 10 can prompt the user the return direction in the return mode.

Please refer to FIG. 1 again. In the flow 200 of FIG. 3, the terrain module 26 of the electronic apparatus 10 of the present invention can assist the user to maintain a terrain datum to record a number of undulant terrain count during the movement process. The terrain data can be stored in the memory 30. When the user begins to move in the forward mode, a user passes an obvious undulant terrain such as climbing over a hill, the user can trigger the terrain module 26 via the control module 32, and the terrain data of the terrain module 26 will be increased by 1. In this case, this action represents that the user has passed through another hill. In the return mode, when the user is heading back via the return route, the user can also trigger the terrain module 26 which means for passing through a hill, and the terrain module 26 decreases the terrain data by 1. For example, during the forward mode the user passes through three hills to reach a destination. When the user returns from the destination to the departure, the user should pass through the three hills before arriving at the departure. As in the return mode, the user triggers the terrain module 26 which decreases the terrain data by 1. It represents that the user has one hill to pass through before arriving at the departure point. When the terrain data decreases to zero, there is no undulant variation between the position of the user and the departure.

In the return mode, the altitude indicating module 22 also utilizes the terrain data maintained/provided by the terrain module 26 to indicate the user about the information of the terrain. When the terrain data is not yet decreased to zero, it represents that there is still undulant variation between the current position of the user and the departure, as the altitude indicating module 22 does not require to accurately indicate to the user to specifically move upwards or downwards. When the terrain data decreases to zero, it represents that there is no undulant variation between the current position of the user and the departure. The altitude indicating module 22 can directly indicate to the user to move towards a higher ground or a lower ground accurately according to the altitude of the departure and the current altitude of the user. For example, when the altitude of the reference coordinate of the departure is lower than the altitude of the current coordinate and the terrain data is decreased to zero, the altitude indicating module 22 can indicate to the user to move downwards via the altitude indicating interface 24.

Figure 4:
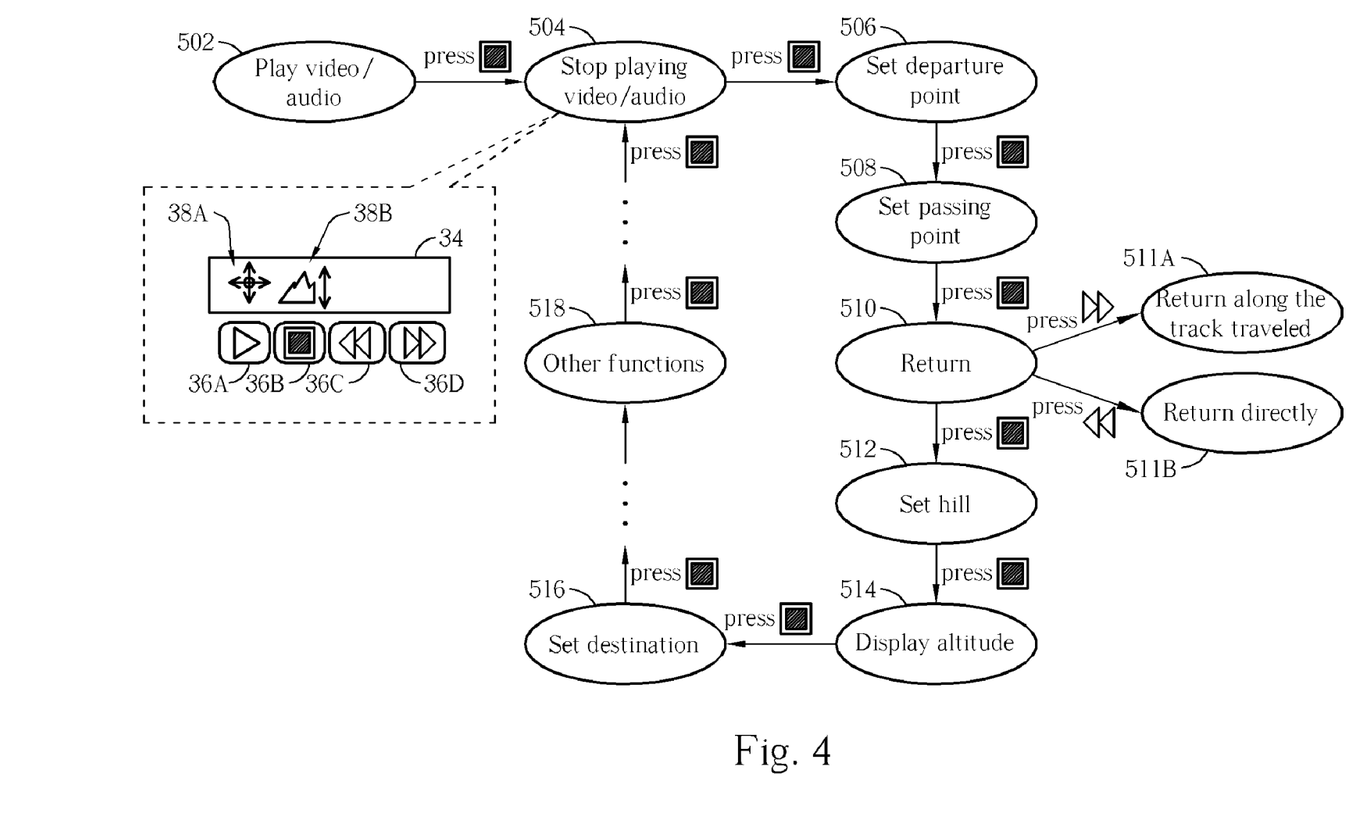
FIG. 4 illustrates a situational diagram of a control module combining the electronic apparatus of FIG. 1.

In the present invention, an interface for controlling a multi-media broadcast and an interface for controlling the positioning/orientation mechanism can be combined into a single interface so that the user can utilize the control module 32 to control the operations of controlling the multi-media broadcast and the positioning/orientation mechanism. FIG. 4 illustrates a situational diagram of a control module combining a video/audio broadcast and a positioning/orientation mechanism. Please refer to FIG. 4 (at the same time please refer to FIG. 1). In the electronic apparatus 10, the control module 32 also includes a display region 34 (such as an LCD display) and a plurality of keys 36A to 36D. Figures 38A and 38B of the display region 34 are utilized to realize the orientation interface 20 and the altitude indicating interface 24 of FIG. 1 respectively. Each key 36A to 36D accepts the user's button control. During the video/audio broadcast, the key 36A can be pressed to begin broadcast on the broadcast module 14 (FIG. 1), the key 36C represents a previous key (such as returning to a previous song or a previous video chapter) and the key 36D represents a next key (such as forwarding to a next song or next video chapter); the key 36B represents a stop button.

In the embodiment of FIG. 4, the present invention utilizes the key 36B to switch between operation states of the electronic apparatus 10 to perform the control of the multi-media broadcast and the positioning/orientation mechanism. Under a status 502, the user can perform the video/audio broadcast. If the key 36B is pressed, the electronic apparatus 10 enters into a status 504 and stops broadcasting. If the key 36B is pressed again in the status 504, then the electronic apparatus 10 switches to operate in a status 506 for the user to set a departure point, which is the start of step 202 (FIG. 3) of the flow 200 where the current coordinate/altitude of the electronic apparatus 10 is recorded as a reference coordinate/altitude. If the key 36B is pressed again, the electronic apparatus 10 enters into a status 508 so that the current coordinate/altitude of the electronic apparatus 10 is recorded as a reference coordinate/altitude of a passing point, which is step 206 in the flow 200. If the key 36B is pressed again in the status 508, a status 510 is being entered which is step 208 in the flow 200, when the user decides to return, the electronic apparatus 10 can begin to operate in the return mode. In the status 510, the user can press the key 36C or key 36D to switch into a status 511 (which enters into a sub-tracking mode) and a status 511B (which enters into a sub-directional mode), which is to select the method of return route in step 302 of the flow 200.

When the user presses the key 36B to switch into a status 512, the user can set a hill data, which is to trigger the terrain module 26 (FIG. 1) to update the terrain data. As mentioned previously, the terrain module 26 updates the terrain data by either increasing the terrain data by 1 or decreasing the terrain data by 1 according to the forward mode or the return mode. When the key 36B is pressed to switch to a status 514, then the current altitude of the user (electronic apparatus 10) can be displayed. If a status 516 is switched again, the user can set coordinate/altitude of a destination, which means that step 102 is performed. The electronic apparatus 10 of the present invention can also have other operation status 518 such as setting a video/audio prompt for notifying arrival. Furthermore, the electronic apparatus 10 can also realize a control/orientation interface by utilizing other methods. For example, a special key for switching mode/status can be installed in the present invention. A touch screen can also be utilized to realize an orientation/altitude indicating interface.

Figure 5:
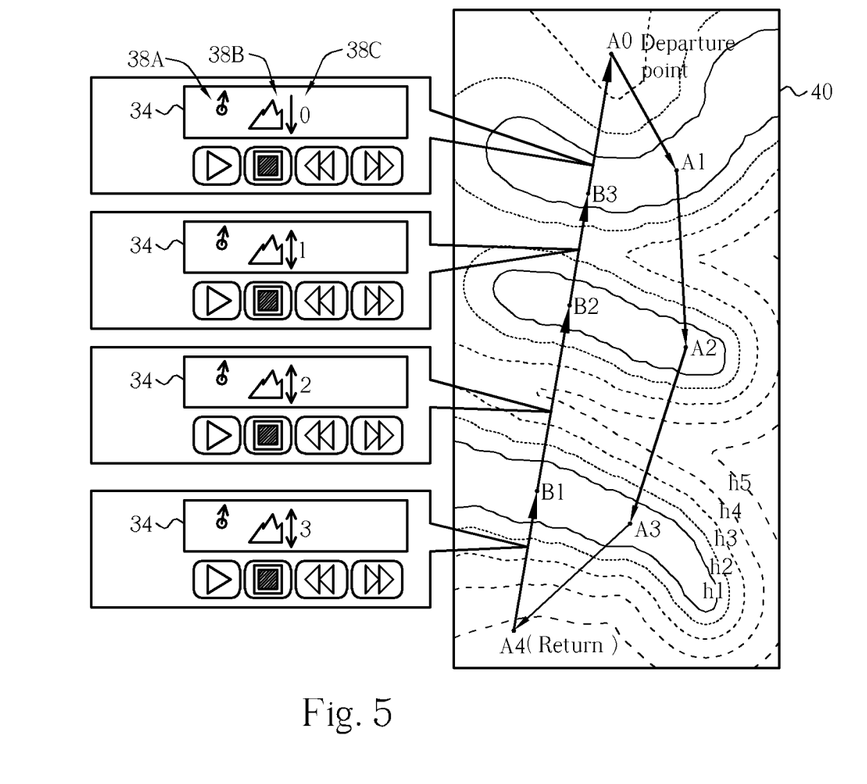
FIG. 5 illustrates a situational diagram of the electronic apparatus of FIG. 1 guiding a user to return to a departure point.

Please refer to FIG. 5. FIG. 5 illustrates a diagram of the control module of FIG. 4 guiding a user to return to a departure, which is a situation in the flow 200 of FIG. 3. Figures 38A and 38B on the display region 34 of the control module 32 are utilized to display the orientation interface 20 and the altitude indicating interface 24. A digit of a F*igure* 38C is utilized to display the terrain data managed by the terrain module 26. In FIG. 5, a map 40 (a contour map) is utilized for illustrating movement situation of the user. An altitude of the contour is represented from h1 (highest) to h5 (lowest). The user can start the flow 200 when departing from point A0 to record coordinate/altitude of point A0 as a reference coordinate of a departure for setting the electronic apparatus 10 in the forward mode. As the user moves along a track, the user can record coordinates/altitudes of points A1, A2 and A3 as reference coordinates of the passing points (which is also a repeat of step 206 of the flow 200). Furthermore, these points can be undulant variation of a hill, when the user passes through these points, the user can trigger the terrain module 26 to update the terrain data via the control module 32. When the flow 200 begins at point A0, the terrain data is being reset to zero. At point A1, followed by the user's trigger, the terrain data is updated to 1. Similarly, at point A2, the terrain data is updated to 2. At point A3, the terrain data is updated to 3, which means that the user has passed through 3 hills.

At point A4, the user decides to return. At this time, the user can set the electronic apparatus 10 to begin step 302 of flow 200, which is to start the backward mode. In FIG. 5, if the user decides to return directly by direction (step 306 of the flow 200), the user can select to go into the sub-directional mode. The electronic apparatus 10 of the present invention sets point A0 as the datum and utilizes the arrow figure 38A of the display region 34 to indicate the direction of point A0. The user can return directly from point A4 to the departure point A0 according to the arrow indication of the figure 38A. When the user returns from point A4 to point A0, as the terrain data is still maintained at 3, the user is still required to overcome the terrain variation before returning to point A0. Therefore the figure 38B utilized to realize altitude indication is not required to accurately indicate to the user to move upwards or downwards; as shown in FIG. 5, arrow of the figure 38B indicates altitude at the same time. When the user passes through point B1, as point B1 is an undulant hill, the user can trigger the terrain module 26 via the control module 32, the terrain module 26 can automatically update the terrain data in a descending manner. The terrain data becomes 2 in between points B1 and B2. Similarly, when the user continues to pass through point B2 on the return route, the terrain data is updated to 1. Lastly, when the user passes through point B3 and the terrain data is updated, the terrain data decreases to zero. When the terrain data is zero, there is no undulant variation in between the position of the user and the departure point A0, and the electronic apparatus 10 can accurately indicate to the user to either move to a higher ground or a lower ground according to the altitude of the current coordinate of the user and the altitude of the reference coordinate of the departure point A0. In FIG. 5, as the altitude of point B3 is higher than point A0, the figure 38B of the altitude indicating interface 24 indicates to the user in a downwards arrow to move downwards. In coordinating with the figures 38A and 38B of the orientation interface 20/altitude indicating interface 24, the user can return to the departure point A0 to realize the return route indicating function of the present invention.

Figure 6:
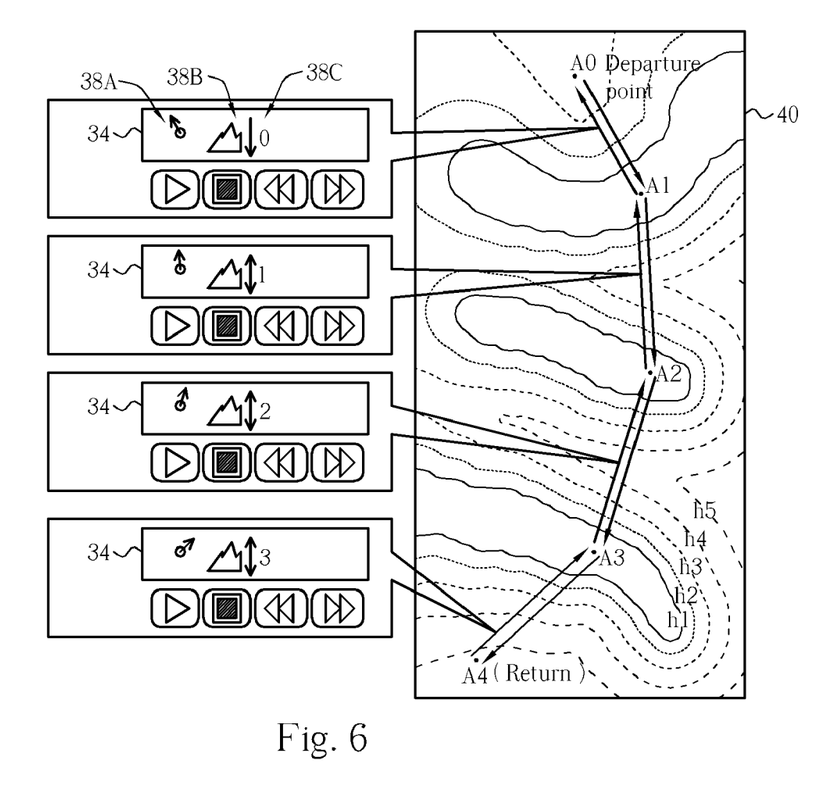
FIG. 6 illustrates a situational diagram of the electronic apparatus of FIG. 1 guiding a user to return to a departure point along a track traveled according to the present invention.

Relative to FIG. 5, if the user selects step 304 which is to return to the departure point A0 by heading a reverse direction on the track traveled from point A4, thus the sub-tracking mode is selected, the electronic apparatus 10 then guides the user to return along the track passing through the passing points A3, A2, and A1, and finally arriving at the departure point A0. Please refer to FIG. 6. FIG. 6 illustrates a situational diagram of guiding the user to return to a departure point along the track traveled according to the present invention. As shown in FIG. 6, at point A4, if the user wants to travel along the route back to the departure point A0, the electronic apparatus 10 will be set to perform step 304. In this situation, the electronic apparatus 10 first set the passing point A3 as the datum to indicate to the user to move towards point A3 utilizing the arrow of figure 38A. When arriving at point A3, the user can trigger to update the terrain data to be decreased to 2, and figure 38A continues to indicate to the user to move towards point A2, and so forth. Lastly, the electronic apparatus 10 directs to the user to return to the departure point A0 via the return points A3, A2, and A1 and realizes the return route indicating function.

In conclusion, in comparison with the prior art, the positioning/orientation mechanism of the present invention combines within the portable video/audio device so that the user can enjoy video/audio and at the same time the user can carry out activities safely in outdoor environments. In FIG. 1, each functional block/module of the electronic apparatus 10 of the present invention can be realized by utilizing software, firmware, or hardware. For example, the functions of the orientation module 18, the height indicating module 22, the terrain module 26 and the wake module 28 can utilize a single processor to execute different software/hardware program respectively. The orientation interface 20, the altitude indicating interface 24 and the broadcast module 14 can also be combined. For example, if the electronic apparatus 10 is a portable video player, the orientation interface 20 and the altitude indicating interface 24 can be combined into the display of the video player. Furthermore, in the example of FIG. 4, the display region 34 can be utilized for displaying status of playing video/audio. The display region 34 can be utilized for displaying sections/chapters of the video/audio played. The memory 30 of FIG. 1 is a non-volatile storage device. For example, a modern music player (such as a MP3 player) stores music files in a non-volatile flash memory or a mini hard disk. The memory 30 of the present invention can be combined within the flash memory or the mini hard disk. Otherwise, the media storage module 12 can retrieve multi-media signals from the non-volatile storage device; the positioning/orientation mechanism can also retrieve reference coordinate/altitude, terrain data and destination coordinate/altitude from the same non-volatile storage device. Furthermore, the memory 30 can also include a volatile RAM. The electronic apparatus 10 of the present invention can also be combined with other functions such as a video/audio capturing mechanism (such as static photograph or moving video recording mechanism, audio recording mechanism, etc).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-function electronic apparatus with positioning/orientation mechanism capable of operating in a forward mode and a backward mode, wherein the forward mode indicates from a departure point to an end point, and the backward mode indicates from the end point to the departure point, the electronic apparatus comprising:
   a position module for detecting a current coordinate and a plurality of coordinates along a track which the electronic apparatus traveled;
   a memory for recording the plurality of coordinates detected by the position module into a plurality of reference coordinates when the electronic apparatus is operating in a forward mode;
   an orientation module for comparing the current coordinate and the reference coordinate of the memory when the electronic apparatus is operating in a backward mode;
   a terrain module for providing a terrain data to record a number of undulant terrain counts along the track which the electronic apparatus traveled, if the electronic apparatus passes an undulant terrain, the terrain module increases the terrain data in the forward mode; and if the electronic apparatus passes the undulant terrain, the terrain module decreases the terrain data in the backward mode; and
   an orientation interface for providing a directional signal being utilized to indicate direction according the difference of the current coordinate and the reference coordinate.

2. The electronic apparatus of claim 1 further comprising:
   a control module for controlling the electronic apparatus to operate in the forward mode when the electronic apparatus begins to move, and controlling the memory to record the coordinate of the departure point and the plurality of coordinates along the track which the electronic apparatus traveled into the plurality of the reference coordinates.

3. The electronic apparatus of claim 1 wherein the orientation module further executes a sub-directional mode and a sub-tracking mode when the electronic apparatus operates in the backward mode, when the orientation module executes the sub-directional mode, the orientation module compares the reference coordinate of the departure point and the current coordinate to provide the directional signal, when the orientation module executes the sub-tracking mode, the orientation module compares the reference coordinates along the track traveled and the current coordinate to provide the directional signal.

4. The electronic apparatus of claim 1 wherein the position module further detects the altitude of the current position of the electronic apparatus and the altitude of the plurality of the reference coordinates along the track that the electronic apparatus traveled, the memory is capable of recording the altitude detected by the position module, and the electronic apparatus further comprising:
- an altitude indicating module for comparing the altitude of the reference coordinate of the memory and the altitude of the current position of the electronic apparatus and providing an altitude indicating signal according to a difference of the two coordinates; and
- an altitude indicating interface for prompting the altitude indicating signal to display the altitude of the reference coordinate relative to the altitude of the electronic apparatus.

5. The electronic apparatus of claim 4 wherein when in the backward mode the terrain data is not yet decreased to zero, the altitude indicating interface is capable of prompting to the altitude indicating signal to indicate either to move to a higher location or a lower location; and when the terrain data is decreased to zero, the altitude indicating interface prompts the altitude indicating signal to indicate to move to the higher location if the altitude of the reference coordinate is higher than the altitude of the current coordinate; and the altitude indicating interface prompts the altitude indicating signal to indicate to move to the lower location if the altitude of the reference coordinate is lower than the altitude of the current coordinate.

6. The electronic apparatus of claim 4 wherein the memory further records a predetermined destination altitude; and the electronic apparatus further comprising:
- a warning module for warning the user when an altitude difference of the predetermined destination altitude and the altitude of the current location of the electronic apparatus compared by the altitude indicating module is less than a predetermined value.

7. The electronic apparatus of claim 1 further comprising:
- a control module for triggering the terrain module to increase or decrease the terrain data when an undulant terrain is passed.

8. The electronic apparatus of claim 1 wherein the memory further records a predetermined destination coordinate, and the orientation module compares the predetermined destination coordinate and the current coordinate; and the electronic apparatus further comprising:
- a warning module for warning a user when a difference of the predetermined destination coordinate and the current coordinate compared by the orientation module is greater than a predetermined value.

9. The electronic apparatus of claim 1 further comprising:
- a media storage module for providing a multi-media signal;
- a broadcast module for broadcasting the multi-media signal; and
- a control module for controlling the broadcast module to start and stop broadcasting the multi-media signal and for controlling the electronic apparatus to operate in the forward mode or the backward mode.

10. The electronic apparatus of claim 1 wherein the reference coordinates recorded in the memory are the coordinates along the track which the electronic apparatus traveled so that the directional signal is provided without the electronic apparatus needing to download an electronic map in the backward mode.

11. A method of indicating direction, comprising:
- detecting a coordinate of a departure point and a plurality of coordinates along a track traveled;
- recording the coordinate of the departure point and the coordinates along a track traveled in a forward mode;
- comparing the current coordinate with the reference coordinates;
- providing terrain data to record a number of undulant terrain count along the track so that in the forward mode the terrain data increases progressively when an undulant terrain is passed; and in a backward mode the terrain data decreases progressively when the undulant terrain is passed; and
- transmitting a prompt for providing a direction of the reference coordinates according to a difference of the current coordinate and the reference coordinate of a departure point.

12. The method of claim 11 wherein in the backward mode the reference coordinate of the departure point and the current coordinate are compared to indicate the direction.

13. The method of claim 11 wherein in the backward mode the reference coordinates along the track traveled by a user are compared to indicate the direction.

14. The method of claim 11 further comprising:
- detecting altitudes of the departure point and the plurality of coordinates along the track traveled in the forward mode;
- recording the plurality of reference coordinates and altitudes of the reference coordinates simultaneously; and
- comparing the altitudes of the reference coordinates and altitude of the current coordinate in the backward procedure; and transmitting a prompt for providing an altitude of the reference coordinate according to an altitude difference of the two coordinates.

15. The method of claim 14 wherein in the backward mode when the terrain data is not yet decreased to zero, the user can be prompted to move to a higher location or a lower location; and when the terrain data is decreased to zero, the higher location will be moved if the altitude of the reference coordinate is higher than the altitude of the current coordinate; and the lower location will be moved if the altitude of the reference coordinate is lower than the altitude of the current coordinate.

16. The method of claim 11 wherein the reference coordinates are recorded along the track in the forward mode for providing a backward direction for a user.

* * * * *